United States Patent
Wagner

[11] Patent Number: 6,100,504
[45] Date of Patent: Aug. 8, 2000

[54] LIQUID PITCHER AND SEPARATE WARMING SYSTEM

[76] Inventor: Alfred R. Wagner, 1432 W. Progress Dr., Hayden Lake, Id. 83835

[21] Appl. No.: 09/295,232

[22] Filed: Apr. 19, 1999

[51] Int. Cl.$^7$ .............................. A47J 31/44; A47J 27/00; F27D 11/02

[52] U.S. Cl. ............................................ 219/432; 219/433

[58] Field of Search .................................. 219/415, 417, 219/432, 433; 99/359, 403

[56] References Cited

U.S. PATENT DOCUMENTS

| | | | |
|---|---|---|---|
| D. 293,871 | 1/1988 | Turner et al. | D7/318 |
| D. 308,154 | 5/1990 | Tow | D7/326 |
| D. 312,747 | 12/1990 | Keung | D7/367 |
| D. 350,454 | 9/1994 | Wong | D7/310 |
| D. 370,588 | 6/1996 | Brookshire et al. | D7/310 |
| D. 374,369 | 10/1996 | Wilkinson | D7/305 |
| D. 398,474 | 9/1998 | Wagner | D7/305 |
| 2,079,611 | 5/1937 | Harvey | 219/19 |
| 2,194,820 | 3/1940 | Connell et al. | 219/433 |
| 2,371,975 | 3/1945 | Parsons | 219/433 |
| 2,448,388 | 8/1948 | Plummer | 219/433 |
| 2,682,602 | 6/1954 | Huck | 219/433 |
| 3,806,701 | 4/1974 | Scott | 219/438 |
| 3,908,111 | 9/1975 | Bois et al. | 219/442 |
| 4,307,287 | 12/1981 | Weiss | 219/442 |
| 4,438,324 | 3/1984 | Narita et al. | 219/441 |
| 4,523,083 | 6/1985 | Hamilton | 219/433 |
| 5,072,095 | 12/1991 | Hoffmann | 219/432 |
| 5,073,699 | 12/1991 | Box | 219/433 |
| 5,274,215 | 12/1993 | Jackson | 219/439 |

FOREIGN PATENT DOCUMENTS

| | | | |
|---|---|---|---|
| 628227 | 3/1936 | Germany | 219/415 |
| 421697 | 12/1934 | United Kingdom | 219/433 |
| 609348 | 9/1948 | United Kingdom | 219/433 |
| 2061091 | 5/1981 | United Kingdom | 219/433 |

OTHER PUBLICATIONS

"One–Quart Crockpot," Walter Drake Catalog, p. 68, date unknown.

*Primary Examiner*—Joseph Pelham
*Attorney, Agent, or Firm*—Wells, St. John, Roberts, Gregory & Matkin, P.S.

[57] ABSTRACT

A pitcher and warming system is described in which a pitcher having a bottom wall and a peripheral side wall leading to an open top is releasably received within a receptacle having a heater. An outwardly projecting shoulder on the peripheral side wall is located between the open top and bottom wall to suspend the pitcher within the receptacle, particularly within a pitcher receiving recess formed in the receptacle. The recess is defined by a receptacle bottom wall, a receptacle side wall joining the receptacle bottom wall and extending to an open peripheral rim. The pitcher is releasably positionable in the pitcher receiving recess with the shoulder engaging the open peripheral rim and suspending the pitcher from the receptacle with the bottom wall spaced above the receptacle bottom wall and with the peripheral side wall spaced from the receptacle side wall and thereby defining an air space between the receptacle bottom and side wall and respective bottom and side wall of the pitcher. Ambient air within the airspace may be heated by the heater and such heated ambient air may heat the bottom and side wall of the pitcher.

11 Claims, 4 Drawing Sheets

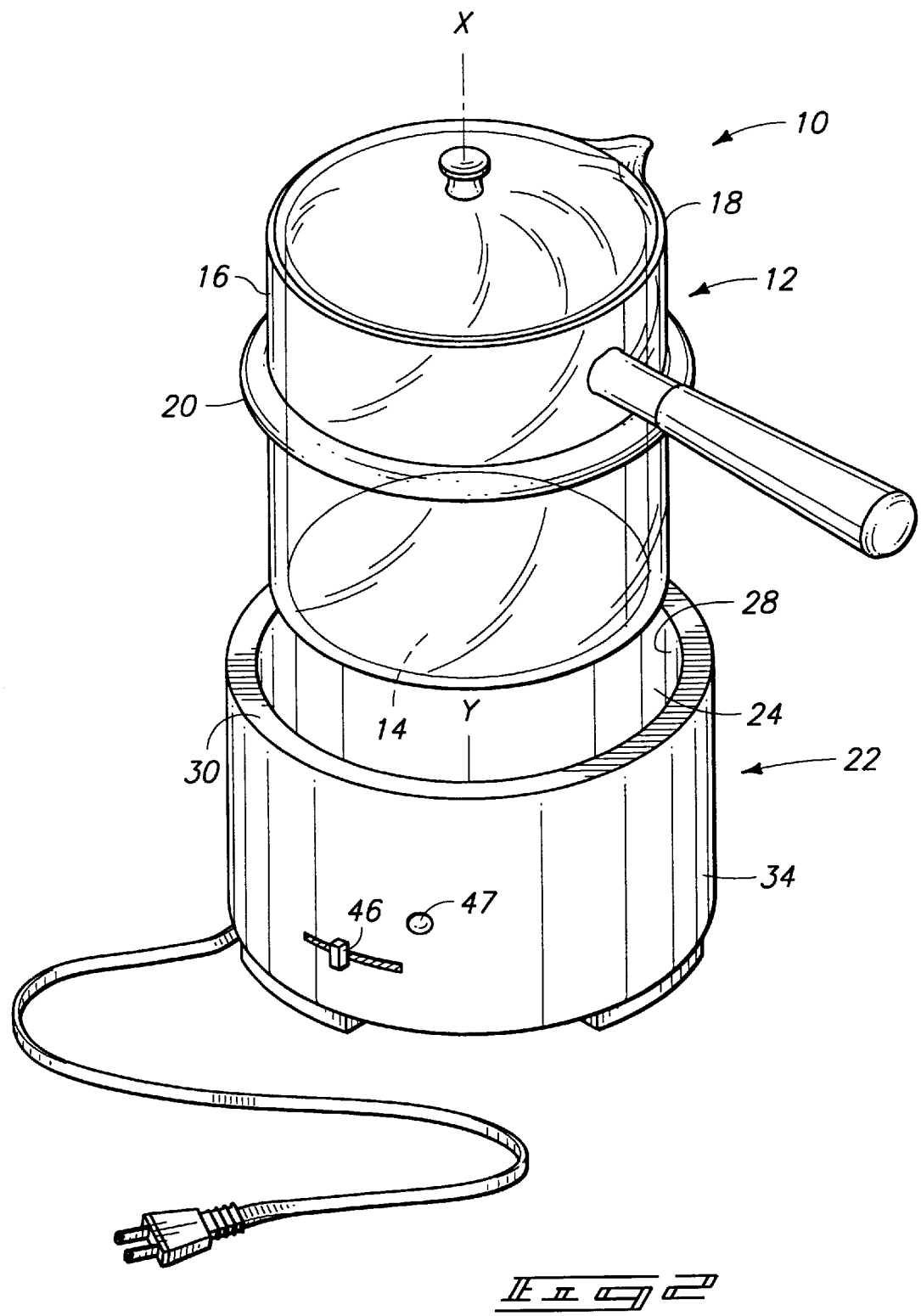

LIQUID PITCHER AND SEPARATE WARMING SYSTEM

TECHNICAL FIELD

The present invention relates to maintaining warmth or warming fluids such as sauces and condiments.

BACKGROUND OF THE INVENTION

The present invention arose from a need observed by the present Applicant for keeping sauces and condiments warm, particularly while remaining dishes of a meal are being prepared. It is also desirable to maintain warm to hot temperatures of foodstuffs, particularly liquids during a meal.

Liquid warmers presently on the market typically include electrical resistance heaters operated at low wattage, and are not capable of warming a liquid that was not already warm when placed in the warmer. Even when such warmers are filled with pre-warmed liquids, the fluid temperature will not be elevated beyond a "warm" state, say between approximately 110° and 140° F. Such temperatures are often inadequate, especially for sauces and gravies.

Of course conventional cooking appliances may be operated to heat fluids to many different consistent temperatures. However, such appliances are usually needed for cooking processes during meal preparation. A sauce or gravy is often set aside while other meal courses are prepared, and by the time the meal is complete, the sauce or gravy is cold and requires reheating.

Even adjustable stove burners set at "simmer" heat settings will cause a sauce to bubble and splatter, creating a stovetop mess. Further, a pan left without stirring at such a setting will often result in the gravy or sauce burning and sticking to the pan.

The present warmer presents a solution to the above problems and has as a first objective, a device that will both warm and keep contents warm without burning or scorching.

Another objective is to provide such a device that will keep contents hot for extended lengths of time.

The above and still further objects and advantages will become apparent from the following description which, taken with the accompanying drawings, disclose a preferred mode of carrying out the present invention.

BRIEF DESCRIPTION OF THE DRAWINGS

Preferred embodiments of the invention are described below with reference to the following accompanying drawings.

FIG. 2 is an exploded perspective view of the preferred system;

DETAILED DESCRIPTION OF THE PREFERRED EMBODIMENTS

Figure 1:
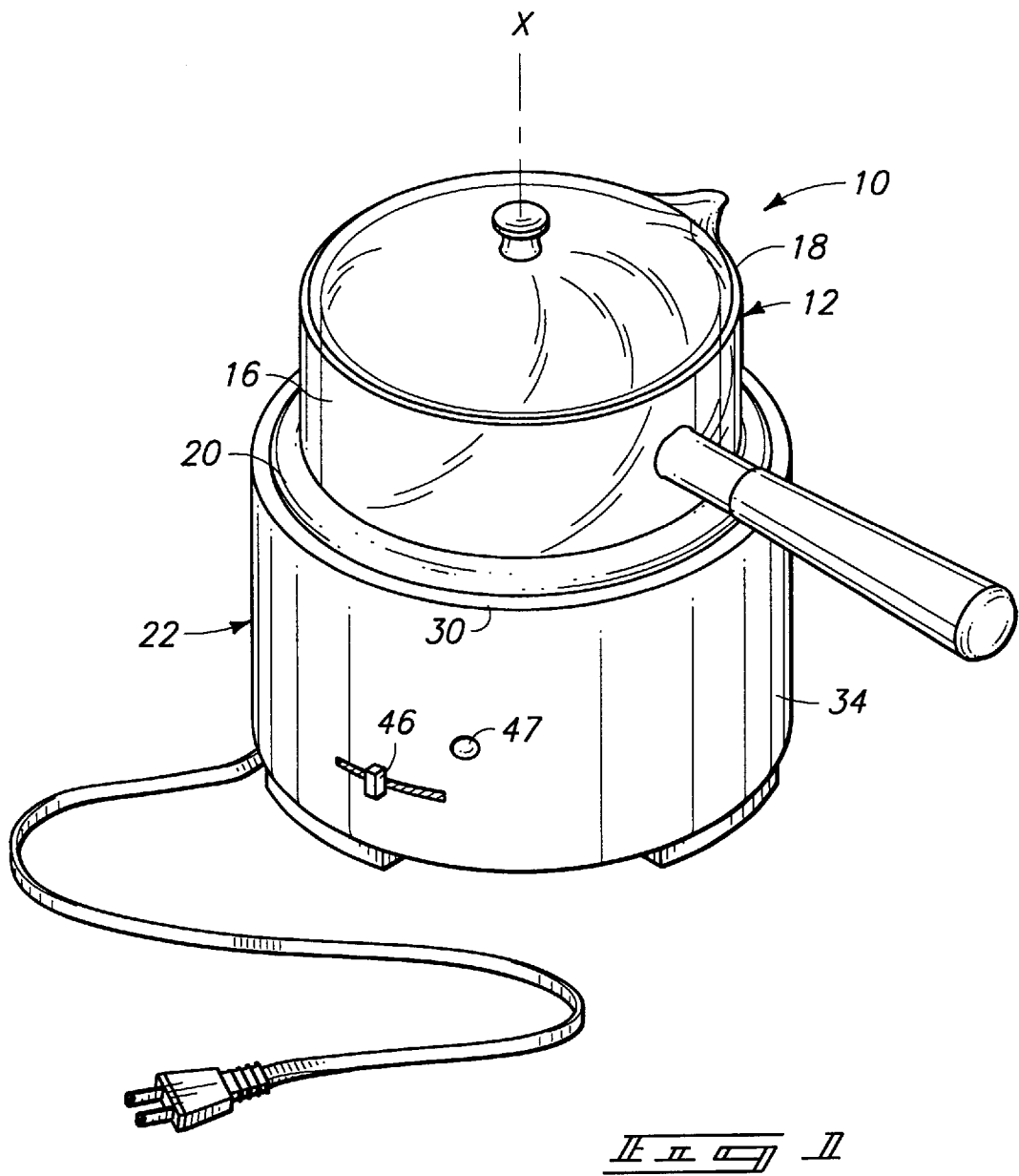
FIG. 1 is a perspective view of a preferred liquid pitcher and separate warming system in which the pitcher portion is in an operative warming condition.

This disclosure of the invention is submitted in furtherance of the constitutional purposes of the U.S. Patent Laws "to promote the progress of science and useful arts" (Article 1, Section 8).

A pitcher and warming system exemplifying a preferred form of the present invention is generally identified in the drawings with the reference character 10. The present system 10 is intended to warm or maintain an elevated temperature for liquids or nearly any food such as condiments, sauces, gravy, soups, stews and the like. Thus the system may be used to receive ambient or cold liquids and be used to gradually warm the liquids to a prescribed elevated temperature (preferably about 200° F.). Alternatively, the system may be used to receive already warmed liquids and be used to maintain the liquids at a desired warmed state.

It is further pointed out that the present system may be manufactured in different sizes to accommodate different quantities of liquids. However for primary household use, volume is likely to be sufficient to receive and warm quantities in the range from about 0.5 pint to one quart.

It is still further emphasized that the present system may be constructed of different yet useful materials. For example, the present pitcher 12 (described in detail below) could be constructed from metal such as aluminum, stainless steel, or even cast iron. A ceramic material or glass may also be used. The same holds true for the warming receptacle 22 (also described in detail below). Conventional techniques commonly used by kitchen appliance manufacturers may be used for manufacturing the present system.

Referring now in greater detail to the drawings, FIGS. 1 and 2 show a preferred example for the present pitcher 12. In preferred forms, the pitcher will have a bottom wall 14, and a peripheral side wall 16. The side wall 16 is advantageously formed about a first axis X and leads to an open top 18.

In the examples illustrated, the side wall 16 is substantially cylindrical about the axis X and the bottom wall 14 is planar and perpendicular to the axis. This is a preferred form, however other configurations could be used. For example, the side wall could be tapered, forming a conical configuration, or a partially spherical shape could be formed along the side wall. It is further possible for the wall to be formed in a regular or irregular polygonal configuration.

An outwardly projecting shoulder 20 is situated in preferred forms along the peripheral side wall. In the example illustrated, the shoulder is integral with the pitcher 12, extends about the side wall periphery, and is located thereon between the open top 18 and bottom wall 14. Providing the shoulder in a substantially continuous peripheral form will aid in stabilizing the pitcher when suspended in the receptacle 22 as described below, and will further aid in preventing any spill-over liquids from entering the warming receptacle 22.

In preferred forms, the shoulder 20 is located along the axis X approximately half way between the pitcher top opening 18 and the bottom wall 14. This leaves a relatively large surface area below the shoulder for insertion into the receptacle 22 for exposure to heated ambient air. Uniform heating of the exposed surface is thus enabled, reducing the likelihood that liquids will be heated in a localized area along the interior surfaces of the pitcher. This in turn significantly reduces the risk that the liquid will scorch and stick to the inside surfaces of the pitcher.

It is advantageous that the shoulder include a beveled, conical or rounded downwardly facing engagement surface portion 21 (FIG. 3) that is formed about the axis X. By this provision, the pitcher may be substantially self-centering in the receptacle 22 with the side wall 16 uniformly spaced from the adjacent receptacle side wall. Thus when the surface portion 21 is lowered to engage the receptacle top, the tendency will be for the surface portion and pitcher to gravitate to a centered position within the receptacle 22.

Reference will now be made in greater detail to the receptacle 22. Generally, the receptacle is an upwardly open cup shaped structure having a pitcher receiving recess 24 (FIG. 2) formed therein. The recess 24 is complementary to the configuration of the pitcher below the shoulder 20 but is larger to loosely accommodate the pitcher bottom wall 14 and that part of the side wall 16 extending between the bottom wall 14 and the shoulder 20.

The preferred receptacle will generally include a receptacle bottom wall 26 and a receptacle side wall 28 joining the receptacle bottom wall 26. The receptacle side wall 28 is preferably formed about a central second axis Y (FIG. 3) and extends from the receptacle bottom wall 26 upwardly to an open peripheral rim 30.

The pitcher is releasably positionable in the pitcher receiving recess 24 with the shoulder surface 21 engaging the open peripheral rim 30. The pitcher is thus suspended from the receptacle rim 30 and positioned with the first and second axes X and Y in substantial coaxial relation, and in such a manner that the bottom wall 14 is spaced above the receptacle bottom wall 26 and with the peripheral side wall 16 spaced substantially uniformly from the receptacle side wall 28. An air space 32 is thereby defined between the receptacle bottom and side walls 26, 28 and respective bottom and side walls 14, 16 of the pitcher. Ambient air within this space is used as a heat conductor for transmitting heat substantially uniformly to the pitcher 12.

It is preferred that the pitcher and receptacle be configured in such a manner that the receptacle bottom wall 26 will be spaced by a distance "B" of approximately 0.5 inches from the pitcher bottom wall 14 (when the pitcher is suspended in the receptacle from the shoulder 20). It is also preferable that the pitcher side wall 16 be spaced by a distance "A" of between approximately 0.25 and 0.375 inches from the receptacle side wall 28. These preferred spatial relationships are graphically indicated in FIG. 4. It has been discovered that the above distances work well to confine the ambient air space 32 to a volume that permits desirable, uniform heat transfer to the pitcher over a minimal amount of time.

Figures 3, 4:
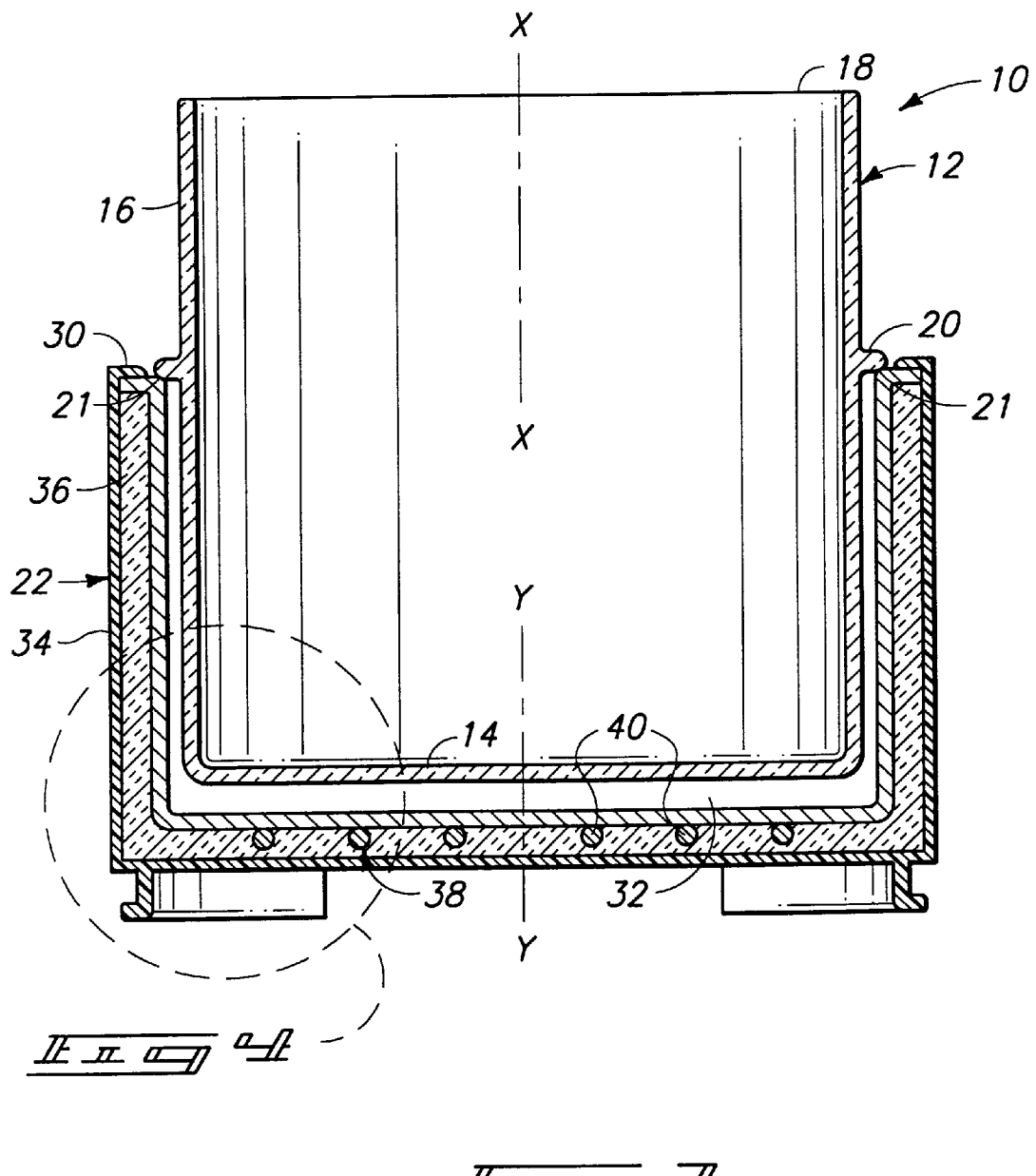
FIG. 3 is a sectional view taken substantially along line 3—3 in FIG. 1.
FIG. 4 is an enlarged fragmented view showing dimensional relationships between the pitcher and warmer components.
Figure 4:
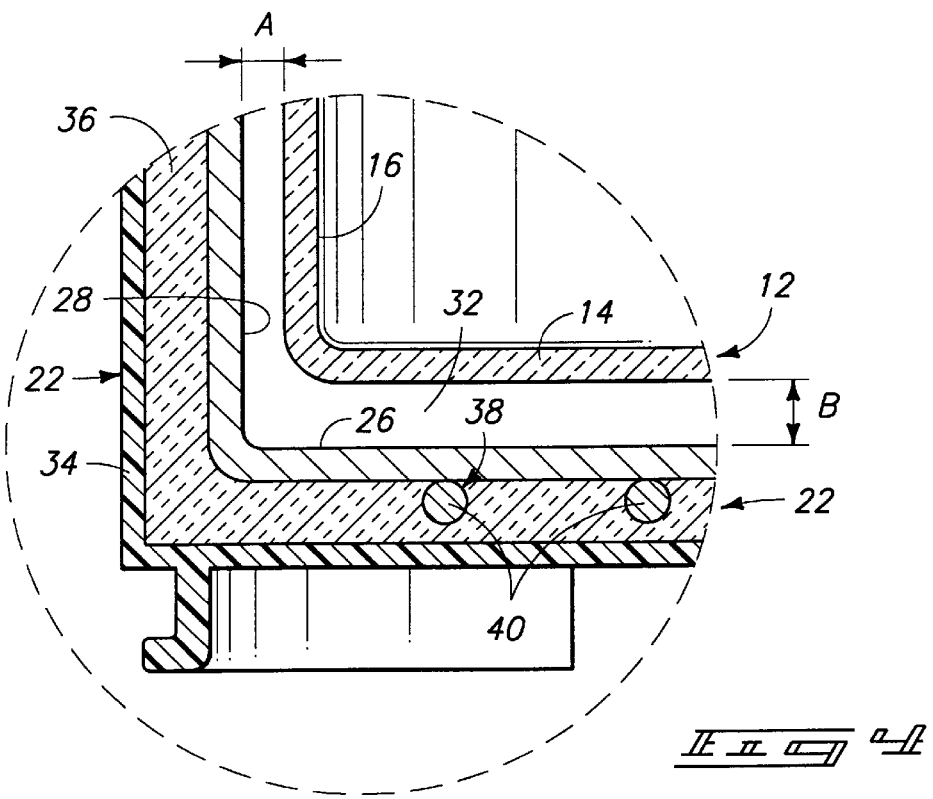

As shown in FIGS. 3 and 4 of the drawings, the receptacle 22 is formed in a double wall construction. This is a preferred construction, enabling the interior wall (forming the pitcher recess 24) to be formed of a heat conductive material such as aluminum, copper, steel or the like. External portions 34 of the receptacle may be formed of a low heat conductive material such as an appropriate plastic material. It may also be desirable to fill the void in the double wall construction with a conventional heat insulation material 36.

In preferred forms of the invention, a heater 38 is mounted to the receptacle 22 adjacent to the pitcher receiving recess 24. The heater is configured to heat ambient air within the recess.

In the illustrated example, an electrical resistance heater element 40 is situated within the receptacle in close proximity or engaging the bottom receptacle wall 26. It is also conceivable that the element 40 could be configured to extend partially up the receptacle wall as well.

It is preferred that the element 40 be constructed of conventional heat element material such as nichrome wire, to be connected to common household current in a conventional manner such that the heat transfers to the receptacle bottom and side walls 14, 16. Ambient air within the airspace 32 is heated by the heater 38 and such heated ambient air may, in turn, heat the bottom and side wall of the pitcher.

The heater is controlled to operate for a prescribed time interval (within a preferred range of 30–60 minutes) and to heat the ambient air within the airspace to a level sufficient to bring the bottom and side wall of the pitcher to a temperature of approximately 200° F. To this end, a conventional timing and switching unit may be provided in the electrical circuitry. Such units are readily available or may be readily designed by those of ordinary skill in small cooking and warming appliance design.

Figure 5:
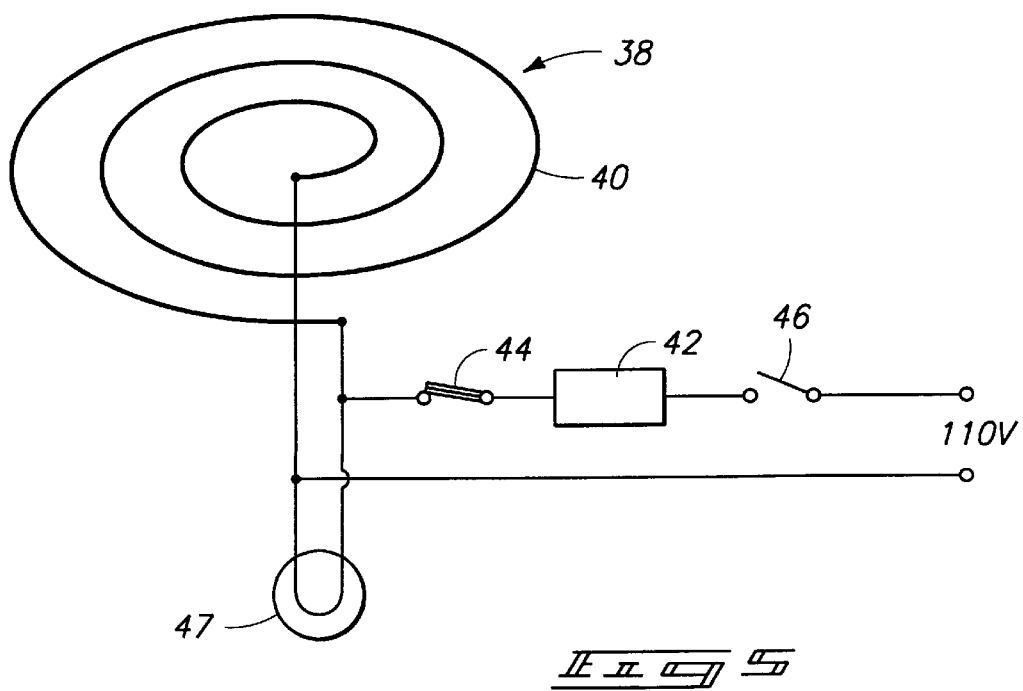
FIG. 5 is a schematic view showing an exemplary power diagram that may be used in the present system.

By way of example, a timer 42 and a thermostat 44 (FIG. 5) may be appropriately installed in the circuit to control the on-off timing for the heater and the thermostat may be used to over-ride the timer should the heater element exceed a prescribed temperature. Likewise the timer may function to over-ride the thermostat and open the circuit after a prescribed time interval (preferably in the range of between 30 and 60 minutes). It is preferable that the timer be of a conventional self re-setting configuration so the operating time is re-set to run after each time the circuit is broken, either by the thermostat, or by a main on-off switch 46. An indicator light 47 may also be provided in the circuit to indicate when the unit is heating.

An on-off switch 46, preferably water proof, may be installed to enable selective operation of the system 10. The switch 46 may be provided in series with preferred timing and thermostatic controls.

The above is simply exemplary of one form of operational control. It should be understood that other control configurations could also be used. For example, a simpler version could be produced without a timer, leaving the user with the option of when to activate or deactivate the heater. Further, the switch 46 might also be eliminated, leaving the switching function to be accomplished simply by plugging and unplugging the heater from a conventional wall socket. On the other hand, further controls could be added to give the user a selection of options. For example the timer could be user programmable, from a timer off mode to a selected maximum time on. A safe range of operating temperatures might also be provided for user selection by use of a variable thermostat.

Use of the present system is a simple matter of placing the ingredients to be warmed in the pitcher 12, placing the pitcher in the receptacle 22, plugging the system into conventional household current, and actuating the switch (if provided) to the "ON" position. The heater 38 will then operate to warm the ambient air captured within the air space 32. The warmed air will in turn substantially uniformly warm the adjacent side and bottom walls 14, 16 of the pitcher, which in turn warm the pitcher contents. Heating is uniform due to the air space 32, and the uniform spacing of the pitcher bottom and side walls from the associated bottom and side walls of the receptacle.

A consistent uniformly applied heat will gradually warm the pitcher contents to a temperature preferably to a level of about 200° F. over a period of time between approximately 60 to 90 minutes. This will leave the user time to complete the remaining dishes of a meal while freeing the usual cooking surfaces for that purpose. The contents will be at a desired serving temperature when the meal is complete, at which time the heater may be turned off and the pitcher removed for serving purposes.

Cleanup is a simple matter of removing the pitcher and cleaning it along with other utensils from the meal. Complete immersion of the pitcher 12 is acceptable using hand or automatic dish washing, since the electrical circuitry is in the receptacle 22, which is separate and will not likely require frequent cleaning. Periodic cleaning of the receptacle 22 may be accomplished using ordinary care not to wet the electrical controls.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pitcher and warming system, comprising:
   a pitcher having a bottom wall and a peripheral side wall leading to an open top;
   an outwardly projecting shoulder on the peripheral side wall and located thereon between the open top and bottom wall;
   a receptacle having a pitcher receiving recess formed therein and including a receptacle bottom wall, a receptacle side wall joining the receptacle bottom wall and extending to an open peripheral rim;
   a heater mounted to the receptacle adjacent to the pitcher receiving recess and configured to heat ambient air within the recess;
   wherein the pitcher is releasably positionable in the pitcher receiving recess with the shoulder engaging the open peripheral rim and suspending the pitcher from the receptacle with the bottom wall spaced above the receptacle bottom wall and heater by a distance of approximately 0.50 inches, and with the peripheral side wall spaced from the receptacle side wall by a distance of between approximately 0.25 and 0.35 inches, and thereby defining an air space between the receptacle bottom and side wall and respective bottom and side wall of the pitcher;
   whereby ambient air within the airspace may be heated by the heater and such heated ambient air may heat the bottom and side wall of the pitcher.

2. The pitcher and warming system of claim 1, wherein the heater is controlled to heat the ambient air within the airspace to a level sufficient to bring the bottom and side wall of the pitcher to a temperature of approximately 200° F.

3. The pitcher and warming system of claim 1, wherein the heater is controlled to operate for a prescribed time interval and to heat the ambient air within the airspace to a level sufficient to bring the bottom and side wall of the pitcher to a temperature of approximately 200° F.

4. The pitcher and warming system of claim 1, wherein the shoulder includes a beveled engagement surface portion configured to engage the peripheral rim of the receptacle and substantially center the pitcher within the pitcher receiving recess with the side and bottom walls of the pitcher substantially uniformly spaced from the receptacle side and bottom walls.

5. The pitcher and warming system of claim 1, wherein the shoulder is positioned along the side wall at a location approximately half way between the bottom wall and open top.

6. A pitcher and warming system, comprising:
   a pitcher having a bottom wall and a peripheral side wall formed about a first axis and leading to an open top;
   an outwardly projecting shoulder on the peripheral side wall and located thereon between the open top and bottom wall;
   a receptacle having a pitcher receiving recess formed therein and including a receptacle bottom wall, a receptacle side wall joining the receptacle bottom wall and formed about a second axis and extending to an open peripheral rim;
   a heater mounted to the receptacle adjacent to the pitcher receiving recess and configured to heat ambient air within the recess;
   wherein the pitcher is releasably positionable in the pitcher receiving recess with the shoulder engaging the open peripheral rim, suspending the pitcher from the receptacle and positioning the first and second axes in coaxial relation in such a manner that the bottom wall is spaced above the receptacle bottom wall and heater by a distance of approximately 0.50 inches, and with the peripheral side wall spaced substantially uniformly from the receptacle side wall by a distance of between approximately 0.25 and 0.35 inches, and thereby defining an air space between the receptacle bottom and side wall and respective bottom and side wall of the pitcher;
   whereby ambient air within the airspace may be heated by the heater and such heated ambient air may heat the bottom and side wall of the pitcher.

7. The pitcher and warming system of claim 6, wherein the shoulder includes a beveled engagement surface portion configured to engage the peripheral rim of the receptacle and substantially center the pitcher within the pitcher receiving recess with the side and bottom walls of the pitcher substantially uniformly spaced from the receptacle side and bottom walls.

8. The pitcher and warming system of claim 6, wherein the heater is controlled to heat the ambient air within the airspace to a level sufficient to bring the bottom and side wall of the pitcher to a temperature of approximately 200° F.

9. The pitcher and warming system of claim 6, wherein the heater is controlled to operate for a prescribed time interval and to heat the ambient air within the airspace to a level sufficient to bring the bottom and side wall of the pitcher to a temperature of approximately 200° F.

10. The pitcher and warming system of claim 6, wherein the shoulder is positioned along the side wall at a location approximately half way between the bottom wall and open top.

11. A pitcher and warming system, comprising:
    a pitcher having a bottom wall and a peripheral side wall formed about a first axis and leading to an open top;
    an outwardly projecting shoulder on the peripheral side wall and located thereon between the open top and bottom wall;
    a receptacle having a pitcher receiving recess formed therein and including a receptacle bottom wall, a receptacle side wall joining the receptacle bottom wall and formed about a second axis and extending to an open peripheral rim;
    a heater mounted to the receptacle adjacent to the pitcher receiving recess and configured to heat ambient air within the recess;
    wherein the pitcher is releasably positionable in the pitcher receiving recess with the shoulder engaging the open peripheral rim, suspending the pitcher from the receptacle and positioning the first and second axes in coaxial relation in such a manner that the bottom wall is spaced above the receptacle bottom wall and with the peripheral side wall spaced substantially uniformly from the receptacle side wall and thereby defining an air space between the receptacle bottom and side wall and respective bottom and side wall of the pitcher;

whereby ambient air within the airspace may be heated by the heater and such heated ambient air may heat the bottom and side wall of the pitcher;

wherein the heater is controlled to operate for a prescribed time interval and to heat the ambient air within the airspace wherein the peripheral side wall is spaced from the receptacle side wall by a distance of between approximately 0.25 and 0.375 inches; and wherein the bottom wall is spaced from the receptacle bottom wall by a distance of approximately 0.50 inches.

* * * * *